United States Patent [19]

Cameron

[11] 4,085,984
[45] Apr. 25, 1978

[54] DOUBLE ROW BEARING ASSEMBLY WITH TAPERED ROLLER BEARINGS

[75] Inventor: Robert W. Cameron, Canton, Ohio

[73] Assignee: The Timken Company, Canton, Ohio

[21] Appl. No.: 811,577

[22] Filed: Jun. 30, 1977

[51] Int. Cl.² ............................................. F16C 23/06
[52] U.S. Cl. ............................. 308/207 A; 308/214; 308/216; 308/219
[58] Field of Search ............... 308/207, 208, 211, 214, 308/216, 202, 219, 231, 226, 234, 189, DIG. 15, 196, 174–176; 180/9.62

[56] References Cited

U.S. PATENT DOCUMENTS

| 2,141,136 | 12/1938 | Heck | 308/214 |
|---|---|---|---|
| 3,326,613 | 6/1967 | Renker | 308/189 R |
| 3,516,717 | 6/1970 | Peterson | 308/189 R |
| 3,845,999 | 11/1974 | Zimmer et al. | 308/207 X |
| 3,934,957 | 1/1976 | Derner | 308/207 A |

Primary Examiner—Trygve M. Blix
Assistant Examiner—Douglas C. Butler
Attorney, Agent, or Firm—Gravely, Lieder & Woodruff

[57] ABSTRACT

A high speed bearing assembly for supporting a shaft within a housing includes two single row tapered roller bearings mounted indirectly so as to in effect create a double row bearing which is capable of accommodating thrust loading in both axial directions, as well as radial loading. The cones of the two bearings are clamped tightly together on a shaft with their thrust ribs and back faces presented away from each other. The cups are fitted loosely into the housing with their back faces presented toward each other. The housing contains a rigid spacer which is interposed between the back faces of two cups, and the spacer carries springs which urge the cups away from each other. When a thrust load is applied to the shaft, one of the single row bearings will take that load, the particular bearing being dependent on the direction in which the load is applied. The cup for whichever bearing takes the thrust load bears against the spacer, and the rollers for that bearing have their large diameter end faces in contact with the cone thrust rib for a full 360° so that all are oriented by the thrust rib. The rollers for the other bearing, that is the bearing that does not take the thrust load, are likewise oriented by the cone thrust rib of that bearing for a full 360°, since the springs in the spacer bear against the cup of that bearing, urging it away from the spacer so as to impose a light preload on the bearing.

11 Claims, 5 Drawing Figures

DOUBLE ROW BEARING ASSEMBLY WITH TAPERED ROLLER BEARINGS

BACKGROUND OF THE INVENTION

This invention relates in general to bearings and more particularly to a double row bearing assembly suitable for high speed operation.

An important feature of a tapered roller bearing is the ease with which it may be adjusted between conditions of end play and preload. Indeed, the adjustment is provided merely by moving the cup axially relative to the cone. While the ideal bearing setting is zero end play, that is, no end play and no preload, this setting is difficult to maintain because so many conditions influence a bearing setting. For example, the size of parts, the speed at which the bearing rotates, the external heat conditions, the type and amount of lubrication, the relative stiffness of the housing in which the bearing is located, and the nature of the fits between cone and shaft, on one hand, and the cup and housing, on the other, all have the capability of altering a bearing setting and must be considered when selecting such a setting.

End play enables the bearing to accommodate high speeds and thermal expansion of parts. Preload, on the other hand, provides maximum stability of the shaft, bearing, and housing walls. If during operation excessive preload develops, the bearing will fail. On the other hand, if excessive end play occurs, the system loses its rigidity and the fatigue life of the bearing is reduced.

It is not uncommon to mount large shafts on two double row bearings with a substantial spread between the two bearings. Each bearing in such a system (See FIG. 1) normally comprises: (1) a double cup, which is actually a single outer race having two inwardly presented tapered raceways, (2) a pair of cone assemblies, each including a cone, a complement of tapered rollers, and a cage to hold the rollers around the cone; and (3) a spacer between the two cones. The thickness of the spacer between the cones controls the adjustment for the bearing, and normally the adjustment is set for a relatively large amount of end play to accommodate thermal expansion. At high operating speeds, the cages of the double row bearings tend to fail, and these failures are normally confined to the cages for the rollers in the rows which do not have a 360° load zone. It appears that failures of this nature derive from the pounding action of the rollers against their cages, and the pounding action eventually causes the cages to break at the intersections of the cage bridges and the annular rings at the large and small ends of the cage. In this regard, a radial load imposed upon a tapered roller bearing is translated into an axial component on the rollers in the load zone, that is, on the rollers through which the radial load is transmitted, and this axial component tends to expel the rollers from the end of the bearing. Actually, the axial component urges the rollers against a thrust rib at the large diameter end of the cone raceway. Not only does the thrust rib prevent expulsion of the rollers, but it further serves to properly orient the rollers between the cup and cone, for when the end face of a roller is against the thrust rib, the axis of the roller assumes a predetermined angle with respect to the face of the rib.

When either row of a double row bearing accommodates a thrust load, which in effect places that row in a condition of preload, all rollers of that row are thrust against the thrust rib and oriented thereby. The cage for that row merely serves to maintain the correct spacing between the rollers, it having no effect of the guidance of the rollers. While the rollers under preload may be guided for a full 360° by their thrust rib, this is not the case with the rollers in the other row. As previously mentioned, only the rollers in the load zone are guided by the thrust rib. As these rollers leave the load zone, they tend to drift away from their thrust rib and when so disposed are guided solely by their cage. Consequently, each time a roller enters the zone of no loading for its bearing, it pounds against its cage. Furthermore, when each roller returns to the load zone, the cage must impact the roller to force it into the load zone. It is this combination of the impacts which occurs at the entrance to and exit from the load zone which eventually destroys the cage.

SUMMARY OF THE INVENTION

One of the principal objects of the present invention is to provide a double row bearing assembly which has end play, thus being capable of high speed operation. Another object is to provide a bearing assembly of the type stated in which a load zone of 360° is maintained on each row of rollers regardless of the magnitude of the thrust load. A further object is to provide a bearing assembly of the type stated which is capable of accommodating high radial loading while providing a reasonable degree of stability in both axial and radial directions. These and other objects and advantages will become apparent hereinafter.

The present invention is embodied in a double row bearing having sets of inner and outer races with rolling elements arranged in two rows between those races. One set of races is fixed in position with respect to each other, while the other set is movable in the axial direction. A spacer exists between the axially movable races, and that spacer contains springs which urge the races apart and impose a slight preload on either row of rollers when the row is not taking a thrust load. The invention also consists in the parts and in the arrangements and combinations of parts hereinafter described and claimed.

DESCRIPTION OF THE DRAWINGS

In the accompanying drawings, which form part of the specification and wherein like numerals and letters refer to like parts wherever they occur.

DETAILED DESCRIPTION

Figure 1:
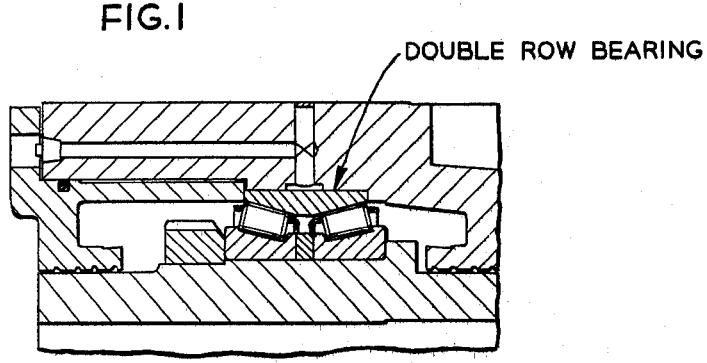
FIG. 1 is a fragmentary sectional view of a shaft and housing showing the former mounted within the latter by means of a conventional double row tapered roller bearing.

Referring now to the drawings (FIG. 2), A represents a double row tapered roller bearing assembly that supports a shaft S within a housing H, and this bearing assembly is capable of accommodating thrust loading in both axial directions. While only one bearing assembly A is illustrated and described, the shaft may be supported by two identical bearing assemblies A which are spaced a substantial distance apart. However, some other type of bearing such as a single row bearing may be used at the other location. Should the shaft S experience a rise in temperature, it will of course expand in the axial direction. The bearing assembly A, notwithstanding the large spread between it and the other bearing, is capable of accommodating this thermal expansion without developing excessive preload.

To prevent the bearing assembly A from shifting longitudinally on the shaft S, the shaft S is provided with a shoulder 2 (FIG. 2) at one end of the bearing assembly A and a nut 4 which threads over the shaft S and is turned down against the other end of the bearing assembly A so that the bearing assembly A is, in effect, captured between the shoulder 2 and the nut 4. The bearing assembly A fits into the housing H and to this end the latter is provided with a bore 6 and a counterbore 8 which opens into the bore at a radial shoulder 10. In addition, the housing H has a removable end closure 12 which fits into the counterbore 8 and is spaced from the shoulder 10.

The bearing assembly A includes (FIG. 2) two single row tapered roller bearings B1 and B2 which are mounted opposite to one another in an indirect configuration so that one is capable of accommodating thrust loading in one axial direction, while the other is capable of accommodating thrust loading in the other axial direction. Each bearing B1 and B2 includes a cone 20 which fits tightly around the shaft S and has an outwardly presented tapered raceway 22. At its one end the cone 20 is provided with an integral thrust rib 24 having an abutment face 26 located at the large end of the tapered raceway 22. At its opposite end the cone 20 is provided with a retention rib 28. The cone 20 has a back face 30 at the end occupied by the thrust rib 24 and a front face 32 at the end occupied by the retaining rib 28. In addition, the bearing B1 or B2 includes a cup 36 which surrounds the cone 20 and has an inwardly presented tapered raceway 38 located opposite to the tapered raceway 22 on the cone 20. At the smaller diameter end of its tapered raceway 38, the cup 36 is provided with a squared off back face 40, while at the large diameter end of the tapered raceway 38 it has a front face 42. The tapered raceways 22 and 38 of the cone 20 and the cup 36 respectively are arranged such that the cones formed by the continuation of each have their apices located at the same point along the common axis of rotation for the bearings B1 and B2. Interposed between the tapered raceways 22 and 38 of the cone 20 and cup 36 is a complement of tapered roller 44, the tapers of which correspond to the tapers of the raceways 22 and 38. Hence, line contact exists between the roller 44 and the tapered raceways 22 and 38. The large diameter ends of the tapered rollers 44 abut against the abutment face 26 of the thrust rib 24 of the cone 20 so that the thrust rib 24 prevents the tapered rollers 44 from being expelled from the bearing B1 or B2 when the bearing is subjected to loading. In addition to the rollers 44, the space between the cup 36 and cone 20 is further occupied by a cage 45 which has pockets into which the rollers 44 fit so as to maintain the correct circumferential spacing between adjacent rollers 44. The cage 45 further prevents the rollers 44 from falling away from the cone 20 when the cone 20 is removed from the cup 36.

Figure 2:
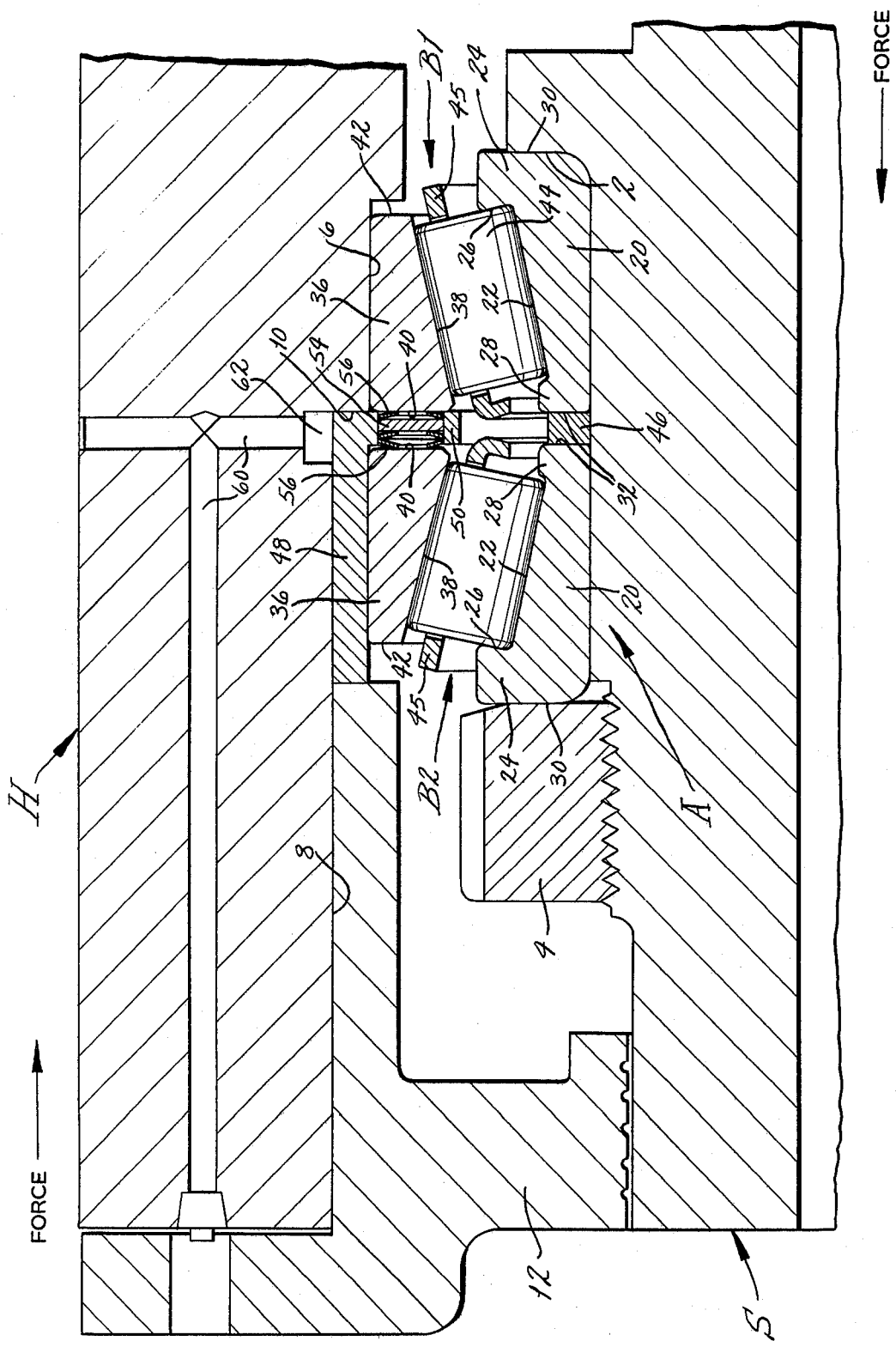
FIG. 2 is a fragmentary sectional view similar to FIG. 1, but showing the shaft mounted in the housing by means of a bearing assembly constructed in accordance with and embodying the present invention.

The cone 20 of the bearing B1 fits snugly over the shaft S with its back face 30 against the shoulder 2 (FIG. 2). The cone 20 of the other bearing B2 likewise fits snugly over the shaft S, but it has its back face 30 against the nut 4. Interposed between the front faces 32 of the two cones 20 is a spacer ring 46. When the nut 4 is turned down, the two cones 20 and the spacer 46 are all clamped tightly together between the nut 4 and the shoulder 2 on the shaft S. When so disposed, the two cups 36 cannot be withdrawn axially over the cones 20, for the tapers of the raceways 22 and 38 and of the rollers 44 are oriented such that this type of removal is not possible.

Figure 3:
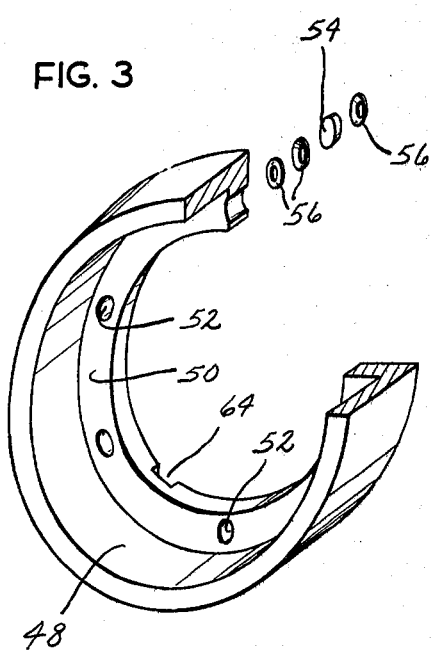
FIG. 3 is a perspective view partially broken away and in section of a sleeve and spacer forming part of the bearing assembly.

The cup 36 of the bearing B1 fits into the housing bore 6, there being a loose fit between the two so that the cup 36 is free to shift axially in the bore 6. In this regard, the front face 42 of the cup 36 is spaced from the back end of the bore 6 to permit a limited amount of axial movement. The cup 36 of the other bearing B2 fits within a sleeve 48 (FIGS. 2 & 3) that is in turn disposed in the counterbore 8 of the housing H. The inner end of that sleeve 48 abuts against the shoulder 10 located at the juncture of the bore 6 and counterbore 8, while the end closure 12 abuts against the outer end, so that the sleeve 48 is clamped tightly between the shoulder 10 and the end closure 12. While the fit between the sleeve 48 and the counterbore 8 of the housing H is tight, the fit between the cup 36 of the bearing B2 and the internal surface of the sleeve 48 is loose so that the cup 36 may shift axially within the sleeve 48. Moreover, the sleeve 48 is slightly longer than the cup 36 so that the end closure 12, which clamps the sleeve 48 in place, is spaced from the front face 42 of the cup 36 for the bearing B2 and thus does not interfere with movement of the cup B2. At its inner end, that is the end adjacent to the shoulder 10, the sleeve 48 is provided with an inwardly directed flange or cup spacer 50 that projects into the space between the two cups 36. Indeed, the back faces 40 of the two cups 36 face the spacer 50, and either cup 36 may abut against the spacer 50. The spacer 50 may be formed integral with the sleeve 48 or it may constitute a separate element clamped between the end of the sleeve 48 and the shoulder 10 of the housing H. The spacer 50 has a plurality of axial pockets or bores 52 (FIG. 3) which extend completely through and are located directly opposite the back faces 40 of the two cups 36. Each bore 52 contains a disk 54 which is capable of moving axially therein and Belleville springs 56 which when undistorted will project outwardly from both ends of the bore 52.

The adjustment of the bearing assembly A represents the amount of axial end play or preload built into it, and this is determined by the thickness of the cone spacer 46 and the cup spacer 50. In most instances the adjustment provides end play, and that end play is the distance the shaft S may be shifted axially within the housing H. For example, the shaft S may be forced to the left until the back face 40 of the cup 36 for the bearing B1 abuts against the cup spacer 50, in which case the rollers 44 for that bearing will be seated tightly against the cone raceway 22 and cup raceway 38. On the other hand, when the shaft S is forced to the right, it will move in that direction until the back face 40 for the cup 36 of the bearing B2 comes against the cup spacer 50 and the rollers 44 of that bearing seat tightly against their cone raceway 38 and cup raceway 22. The distance the shaft S moves to the right is the end play in the bearing assembly A. Some end play is desirable to accommodate for thermal expansion of the shaft S. Otherwise one of the bearings B1 or B2 would operate under a condition of excessive preload.

Since the shaft S rotates at high speed, the bearing assembly A requires constant lubrication. Otherwise, the bearings B1 and B2 would fail at critical surface areas, therein, namely along the abutment faces 26 of the two cones 20 and at the large diameter end faces of the rollers 44. This lubrication is delivered through the housing H to the bearing assembly A. In particular, the housing H has a duct 60 which leads up to an annular relief 62 that surrounds the cup spacer 50. The spacer 50, in turn, has radial channels 64 offset from some of its axial bores 52, and the channels 64 (FIG. 3) open into the space between the two bearings B1 and B2. A liquid lubricant is pumped into the duct 60.

OPERATION

In use, the bearing assembly A accommodates heavy radial loading as well as thrust loading in both axial directions, and in contrast to conventional tapered roller bearing assemblies, these loads are taken at high speeds without any damage to the cages 45. The radial loading is taken in the usual manner. As a result of that loading, generally axial forces are applied to the rollers 44 in the load zone, and these forces tend to expel the rollers 44 from the bearing assembly A. The thrust ribs 24 at the ends of the cones 20 prevent expulsion.

When a thrust load is applied to the shaft S in the direction which urges the shaft shoulder 2 toward the housing end closure 12 (FIG. 2), the load is transferred through the set of rollers 44 for the bearing B1 to the cup 36 and thence to the sleeve 48 where it is resisted by the end closure 12. In that case the back face 40 of the cup 36 bears firmly against the cup spacer 50 on the sleeve 48. Moreover, the large diameter ends of the rollers 44 move against the abutment face 26 of the thrust rib 24 for a full 360° so that all of the rollers 44 in the bearing B1 are oriented by the thrust rib 24. The cage 45 of the bearing B1 merely serves to maintain the proper spacing between adjacent rollers 44.

The other bearing B2, on the other hand, carries only the radial load, but nevertheless its rollers 44 likewise bear against the abutment face 26 on the thrust rib 24 of its cone 20 for a full 360°, so that all of those rollers 44 are likewise oriented by the thrust rib 24. This occurs by virtue of the fact that the Belleville springs 56 in the cup spacer 50 bear against the back face 40 of the cup 36 and urge the cup 36 axially away from the spacer 50. Indeed, sufficient force is applied to the cup 36 to firmly seat the rollers 44 against the raceways 22 and 38 of the cone 20 and cup 36, even in the unloaded zone, and this in turn causes the rollers 44 to move against the thrust rib 24. As a result, the large diameter end faces of all the rollers 44 bear against the abutment face 26 on the thrust rib 24. The cup 36 experiences little resistance in moving inasmuch as it fits loosely within the sleeve 48.

On the other hand, when the thrust load is applied in the opposite direction, that is in the direction which urges the nut 4 toward the shoulder 10 in the housing H, then the thrust load itself is enough to maintain the rollers 44 of the bearing B2 against the abutment face 26 of the thrust rib 24 on the cone 20 and to further urge the loosely fitted cup 36 axially in the sleeve 48 until its back face 40 abuts against the shoulder 50 on the sleeve 48. The bearing B1 now becomes unloaded insofar as thrust is concerned, but nevertheless, all of its rollers 44 remain against the abutment face 26 of the thrust rib 24 since the Belleville springs 56 urge the cup 36 of the bearing B1 axially in the housing bore 6 to the extent that the rollers 44 are seated tightly against both the raceways 22 and 38 of the cone 20 and cup 36, which causes the large diameter end faces of all of the rollers 44 to bear against the abutment face 26 of the thrust rib 24.

In effect, each bearing B of the double row bearing assembly A is capable of accommodating thrust loading in only one direction and the bearing B1 or B2 which does accommodate the thrust loading has all of its rollers 44 seated against the raceways 22 and 38 of the cone 20 and cup 36 by virtue of the thrust load. When this is the case, the large diameter end faces of the rollers 44 bear against the abutment face 26 of the thrust rib 24 of that bearing. The opposite bearing does not accommodate any thrust loading, but nevertheless accepts its share of radial loading and in conventional installations the radial loading is sufficient only to urge the rollers in the load zone against the abutment face 26 of the thrust rib 24. The Belleville springs 56 in effect impose a preload, and this preload maintains all of the roller 44 against the thrust rib 26 for the cone 20 of the bearing so that the rollers 44 are oriented by the thrust rib 26 and not by the cage 45.

A double row bearing assembly A is capable of supporting a shaft at extremely high speeds of rotation, and in the case of high speed operation oil is pumped through the duct 60 to the space between the two bearings B1 and B2. Some of this oil flows outwardly along the outer surfaces of the cups 36 to enable the cups 36 to easily slide within the sleeve 50 and the housing bore 6. More of the oil flows inwardly and, due to the natural pumping action of the bearings B1 and B2, is forced axially toward the thrust ribs 24 where it lubricates the abutment faces 26 on them. This is the most critical surface in a tapered roller bearing insofar as lubrication is concerned, since sliding action occurs along this surface. Along all other surfaces pure rolling action exists.

MODIFICATIONS

Figure 4:
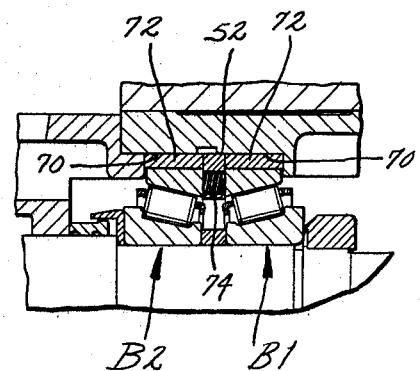
FIG. 4 is a sectional view of a modified bearing assembly of the present invention.

In lieu of machining a bore and a counterbore into the housing H, a single bore 70 (FIG. 4) may be utilized with separate sleeves 72 around the cup 36 of each bearing B1 and B2. Moreover, the spacer 52 is a separate component which is captured between the ends of the two sleeves 72. The bores through the spacer may house conventional coil springs 74 in lieu of Belleville springs.

Figure 5:
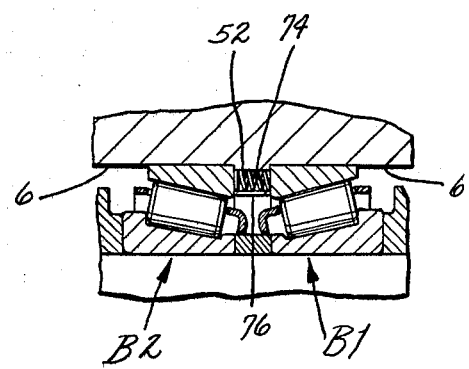
FIG. 5 is a sectional view of still another modified bearing assembly embodying the present invention.

Also, a cup spacer 76 (FIG. 5) may be formed as an integral portion of the housing H, in which case the sleeves 72 are eliminated and the cups 36 shift in housing bores 6 extending outwardly from the spacer 76. The spacer 76 may be axially bored to provide the axial bores 52 which accommodate the Belleville springs 56 or coil springs 74.

This invention is intended to cover all changes and modifications of the example of the invention herein chosen for purposes of the disclosure which do not constitute departures from the spirit and scope of the invention.

What is claimed is:

1. A double row bearing assembly for supporting a structure such as a shaft within another structure such as a housing and being capable of accommodating thrust loading in both axial directions as well as radial loading; said bearing assembly comprising: a set of inner races positioned on the one structure with each inner race having an outwardly presented raceway; a set of outer races positioned on the other structure with each outer race having an inwardly presented raceway located opposite the outwardly presented raceways of the inner races, the races of one of the sets being fixed in position with respect to each other and the races of the other set being movable axially with respect to each other; rolling elements between the raceways of corresponding inner and outer races, whereby the rolling elements are arranged in two circumferential rows, the rolling elements of one of the rows and the raceways against which they are located being configured to accommodate thrust loading in one axial direction, the rolling elements of the other row and the raceways against which they are located being configured to accommodate thrust loading in the other axial direction; a spacer between the axially movable races and being fixed in position with respect to the structure along which those races are located so as to serve as an abutment for those races; and springs carried by the spacer and urging the movable raceways away from each other, whereby when a thrust load is applied in one axial direction, one movable race will be blocked by the spacer and the thrust load will maintain the rolling elements of that race seated against its raceway and the raceway of the corresponding fixed race for a full 360°, and the springs will urge the other movable race away from the spacer to the extent that the rolling elements along that movable race will remain seated against its raceway and against the raceway for the corresponding fixed race for a full 360°, and vice-versa when the thrust loading is applied in the other direction.

2. A bearing assembly according to claim 1 wherein the inner races are on a shaft and the outer races are in a housing through which the shaft extends; and wherein the outer races are movable in the axial direction and the spacer is fixed in position with respect to the housing.

3. A bearing assembly according to claim 2 and further comprising a sleeve fixed in position with respect to the structure in which the axially movable races are fitted and holding the spacer in a fixed position within that structure; and wherein one of the axially movable outer races is within the sleeve.

4. A bearing assembly according to claim 3 wherein the sleeve is formed integral with the spacer.

5. A bearing assembly according to claim 1 wherein the inner races are cones having tapered raceways and thrust ribs at the large diameter ends thereof, the outer races are cups having inwardly presented tapered raceways, and the rolling elements are tapered rollers located between the cups and cones and having their large diameter end faces presented toward the thrust ribs, whereby when the thrust load is applied in one axial direction, the thrust load itself will cause the large diameter ends of the rollers for one row to bear against the thrust rib on the cone for that row and the springs will cause the large diameter ends of the rollers for the other row to bear against the thrust rib on the cone for that other row, and vice-versa, when the thrust loading is applied in the other axial direction.

6. A bearing assembly according to claim 5 wherein the spacer is interposed between the two cups, and the cups have their back faces presented toward the spacer.

7. A bearing assembly according to claim 6 wherein the spacer has a plurality of pockets which open axially out of it and the springs are in the pockets.

8. A bearing assembly according to claim 7 wherein the pockets extend completely through the spacer and the springs are maintained in a compressed condition within the pockets.

9. A bearing assembly according to claim 6 and further comprising another spacer interposed between the cones and means for clamping the cones and the other spacer tightly together in a rigid position on the shaft with the front faces of the cones against the other spacer.

10. A bearing assembly according to claim 1 wherein the spacer has a plurality of pockets which open axially out of it and the springs are in the pockets.

11. A bearing assembly for mounting a shaft in a housing and for accommodating thrust loading in both axial directions, said bearing assembly comprising first and second cones mounted in a fixed position on the shaft with their back faces presented away from each other and each having a tapered raceway and a thrust rib at the large diameter end of its tapered raceway, first and second cups surrounding the first and second cones, respectively, and positioned within the housing with their back faces presented toward each other, the cups being capable of shifting with respect to the housing; tapered rollers arranged in first and second rows with the rollers of the first row being between the raceways of the first cup and first cone and the rollers of the second row being between the raceways of the second cup and second cone, the rollers of each row being oriented such that their large diameter ends are presented toward the thrust ribs on the cone around which the row is disposed; a spacer located between the back faces of the two cups and being fixed in position with respect to the housing; and springs carried by the spacer and oriented such that they urge the cups away from the spacer so that the rollers of each row will remain seated against the raceways of their respective cups and cones and the large diameter ends for those rollers will remain against the thrust ribs of their respective cones for a full 360°, even when the rollers are not taking a thrust load, whereby the rollers remain properly oriented in the zone of no loading.

* * * * *